(12) United States Patent
Aoki et al.

(10) Patent No.: US 12,024,241 B2
(45) Date of Patent: Jul. 2, 2024

(54) STEERING CONTROL DEVICE

(71) Applicant: DENSO CORPORATION, Kariya (JP)

(72) Inventors: Takashi Aoki, Kariya (JP); Motoaki Kataoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 521 days.

(21) Appl. No.: 17/242,602

(22) Filed: Apr. 28, 2021

(65) Prior Publication Data

US 2021/0245796 A1 Aug. 12, 2021

Related U.S. Application Data (63) Continuation of application No. PCT/JP2019/040850, filed on Oct. 17, 2019.

(30) Foreign Application Priority Data

Nov. 2, 2018 (JP) ................................ 2018-207499

(51) Int. Cl.
*B62D 5/04* (2006.01)
*B62D 6/10* (2006.01)

(52) U.S. Cl.
CPC ......... *B62D 5/0412* (2013.01); *B62D 5/0463* (2013.01); *B62D 6/10* (2013.01)

(58) Field of Classification Search
CPC ...... B62D 5/0412; B62D 5/0463; B62D 6/10; B62D 1/286; B62D 6/008; B62D 15/025
See application file for complete search history.

(56) References Cited

U.S. PATENT DOCUMENTS

| 9,586,619 B1* | 3/2017 | Akatsuka ............. B62D 15/025 |
| 10,996,673 B1* | 5/2021 | Katzourakis ........... G05D 1/021 |
| 2017/0217477 A1 | 8/2017 | Akatsuka et al. |
| 2018/0015947 A1 | 1/2018 | Akatsuka et al. |

FOREIGN PATENT DOCUMENTS

| JP | 2015-020604 A | 2/2015 |
| JP | 2015-033942 A | 2/2015 |
| WO | WO-2017213119 A1 * | 12/2017 ............. B62D 1/286 |

OTHER PUBLICATIONS

English translation of Tsubaki et al. (WO 2017213119) (Year: 2017).*

* cited by examiner

*Primary Examiner* — James M McPherson
*Assistant Examiner* — Kyle J Kingsland
(74) *Attorney, Agent, or Firm* — MASCHOFF BRENNAN

(57) ABSTRACT

A steering control device performs an assist control for generating an assist command that generates an assist torque based on a steering torque. The steering control device acquires a target value of physical quantity related to a steering. The steering control device performs a tracking control for generating a tracking command that generates an automatic steering torque for causing a detection value of physical quantity to track the target value.

5 Claims, 8 Drawing Sheets

STEERING CONTROL DEVICE

CROSS REFERENCE TO RELATED APPLICATIONS

The present application is a continuation application of International Patent Application No. PCT/JP2019/040850 filed on Oct. 17, 2019, which designated the U.S. and claims the benefit of priority from Japanese Patent Application No. 2018-207499 filed on Nov. 2, 2018. The entire disclosures of all of the above applications are incorporated herein by reference.

TECHNICAL FIELD

The present disclosure relates to a steering control device.

BACKGROUND

A steering control device performs a tracking control such as an assist control for generating an assist torque and a lane keep control for generating an automatic steering torque. When a driver performs an intervention operation during the tracking control, the steering control device switches the control.

SUMMARY

The present disclosure provides a steering control device. The steering control device performs an assist control for generating an assist command that generates an assist torque based on a steering torque. The steering control device acquires a target value of physical quantity related to a steering. The steering control device performs a tracking control for generating a tracking command that generates an automatic steering torque for causing a detection value of physical quantity to track the target value.

BRIEF DESCRIPTION OF DRAWINGS

The features and advantages of the present disclosure will become more apparent from the following detailed description made with reference to the accompanying drawings. In the drawings.

DETAILED DESCRIPTION

For example, an exemplary control device includes an assist control calculation unit, a target tracking control calculation unit, and an intervention detection unit. The assist control calculation unit generates an assist command. The target tracking control calculation unit generates a tracking command for causing an actual angle of a motor to track a target angle. The intervention detection unit detects an intervention to a tracking control by a driver. The intervention detection unit generates an intervention coefficient whose value decreases from 1 to 0 as the driver's steering intervention degree increases. The target tracking control calculation unit decreases responsiveness of the tracking control as the intervention coefficient approaches 1 to 0.

The exemplary control device still generates an automatic steering torque by the tracking command during the control switching from the start of the intervention operation by the steering of the driver until the intervention coefficient drops to 0 and the switch to the assist control is completed. Since the assist torque is canceled by this automatic steering torque, the steering torque during control switching may be excessive.

The present disclosure provides a steering control device that reduces a steering torque when a tracking control is switched to an assist control by steering of a driver.

An exemplary embodiment of the present disclosure provides a steering control device. The steering control device includes an assist control calculation unit, a target tracking control calculation unit, an intervention detection unit, a limit value calculation unit, and a motor drive circuit. The assist control calculation unit is configured to perform an assist control for generating an assist command that generates an assist torque based on a steering torque. The target tracking control calculation unit is configured to acquire a target value of physical quantity related to a steering, and perform a tracking control for generating a tracking command that generates an automatic steering torque for causing a detection value of physical quantity to track the target value. The intervention detection unit is configured to detect an intervention to the tracking control by a steering of driver. The limit value calculation unit is configured to calculate a tracking command limit value that is an upper limit of an absolute value of the tracking command, and output the tracking command limit value to the target tracking control calculation unit. The motor drive circuit is configured to drive a motor based on a drive command that is an addition value of the assist command and the tracking command. The motor outputs the assist torque and the automatic steering torque. The limit value calculation unit decreases an absolute value of the tracking command limit value in response to the assist command such that an increase of the steering torque caused by the tracking command canceling the assist command is inhibited when a control is switched from the tracking control to the assist control by the steering of driver.

In the exemplary embodiment of the present disclosure, the configuration inhibits the tracking command from obstructing the steering at the time of control switching from the start of the intervention operation by the steering of the driver to the completion of the transition to the assist control. Therefore, the steering torque at the time of control switching can be decreased.

A steering control device according to one embodiment will be described with reference to the drawings. An EPS-ECU as a "steering control device" is applied to an electric power steering system of a vehicle. The EPS-ECU generates an "assist control" that generates an assist command for generating an assist torque, and a "tracking control" that generates a tracking command for generating an automatic steering torque. In the present embodiment, as the tracking control, a lane keep control that controls a steering angle so that the vehicle travels along the lane is executed.

[Electric Power Steering System]

Figure 1:
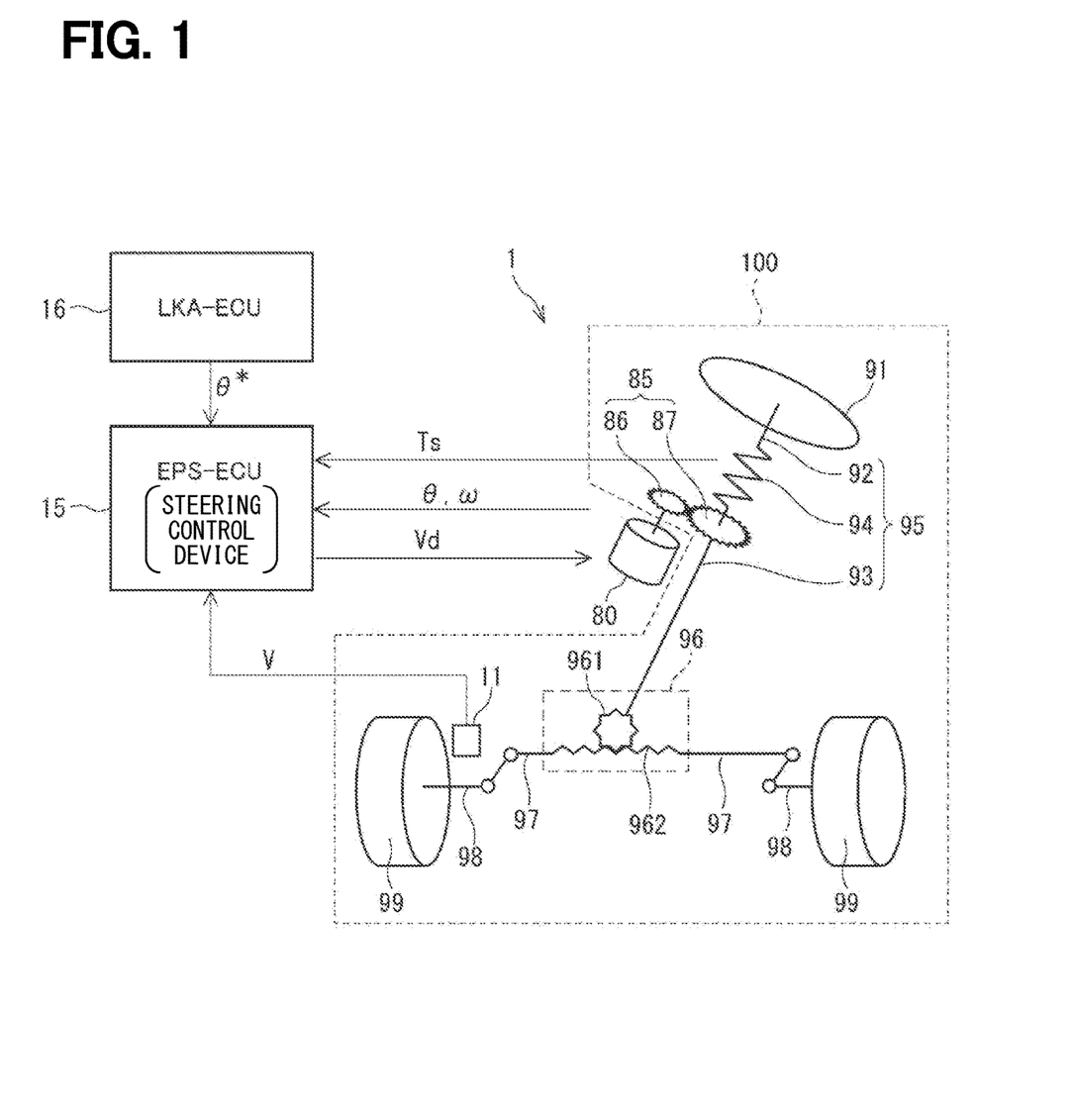
FIG. 1 is a schematic diagram showing an electric power steering system.

As shown in FIG. 1, an electric power steering system 1 assists a driver's operation of a steering wheel 91 by a driving torque of a motor 80 and performs the tracking control such as the lane keep control. The steering wheel 91 is fixed to one end of a steering shaft 92, and an intermediate shaft 93 is provided on the other end of the steering shaft 92. The steering shaft 92 and the intermediate shaft 93 are coupled by a torsion bar of a torque sensor 94. These components provide a steering shaft assembly 95. The torque sensor 94 detects a steering torque Ts based on a torsion angle of the torsion bar.

A gear box 96 including a pinion gear 961 and a rack 962 is provided at an end of the intermediate shaft 93 opposite to the torque sensor 94. When a driver rotates the steering wheel 91, the pinion gear 961 rotates together with the intermediate shaft 93, and the rack 962 moves to the right and left with the rotation of the pinion gear 961. Tie rods 97 are provided at both ends of the rack 962 and coupled to tires 99 via knuckle arms 98. The tie rods 97 reciprocate right and left to pull and push the knuckle arms 98 and change the direction of the tires 99.

The motor 80 is, for example, a three-phase AC brushless motor. The motor 80 outputs the driving torque based on a drive voltage Vd output from the EPS-ECU 15. When the motor 80 is provided by the three-phase AC motor, the drive voltage Vd means each phase voltage of U phase, V phase and W phase. Rotation of the motor 80 is transmitted to the intermediate shaft 93 via a speed reduction mechanism 85 having a worm gear 86, a worm wheel 87 and the like. In addition, steering rotation of the steering wheel 91 and rotation of the intermediate shaft 93 caused by a reaction force from a road surface are transmitted to the motor 80 via the speed reduction mechanism 85.

The electric power steering system 1 shown in FIG. 1 is a column-assisted type in which the rotation of the motor 80 is transmitted to the steering shaft 95. However, the EPS-ECU 15 of the present embodiment may be applied to an electric power steering system of a rack assist type or to a steer-by-wire system in which a steering wheel and road wheels are mechanically separated. In another embodiment, a multi-phase AC motor other than three phases or a DC motor with brushes may be used as the motor.

Here, the entire structure from the steering wheel 91 to the tires 99 to which the steering force of the steering wheel 91 is transmitted is referred to as a steering system mechanism 100. The EPS-ECU 15 controls the steering torque Ts generated by the steering system mechanism 100 by controlling a driving torque output by the motor 80 to the steering system mechanism 100. The EPS-ECU 15 acquires the steering torque Ts, a steering angle θ and a steering angular velocity ω from the steering system mechanism 100.

Further, the EPS-ECU 15 acquires a vehicle speed V detected by a vehicle speed sensor 11 provided at a predetermined part of the vehicle.

Further, the EPS-ECU 15 acquires a target angle θ* from a Lane Keep Assist (LKA)-ECU 16. The LKA-ECU 16 operates by electric power from an in-vehicle battery (not shown), detects the position of the subject vehicle in the traveling lane or the traveling lane from the image in front of the subject vehicle captured by the in-vehicle camera (not shown), and sets a target course based on the detected result. Further, the LKA-ECU 16 sets the target angle θ* based on the detected value of the vehicle speed or the steering angle, and outputs the target angle θ* to the EPS-ECU 15. The target angle θ* is a target value of the motor rotation angle or steering angle for traveling along the target course.

The EPS-ECU 15 operates by electric power from an in-vehicle battery (not shown), and generates an assist command and a tracking command based on the acquired information. Then, the EPS-ECU 15 applies the drive voltage Vd to the motor 80 according to the addition value of the assist command and the tracking command, and generates an assist torque and an automatic steering torque. Various processes in the EPS-ECU 15 may be software processes of a program stored in a tangible memory device such as a ROM and executed by a CPU, or may be hardware processes executed by discrete electronic circuits.

[Configuration and Operational Effect of EPS-ECU]

Figure 2:
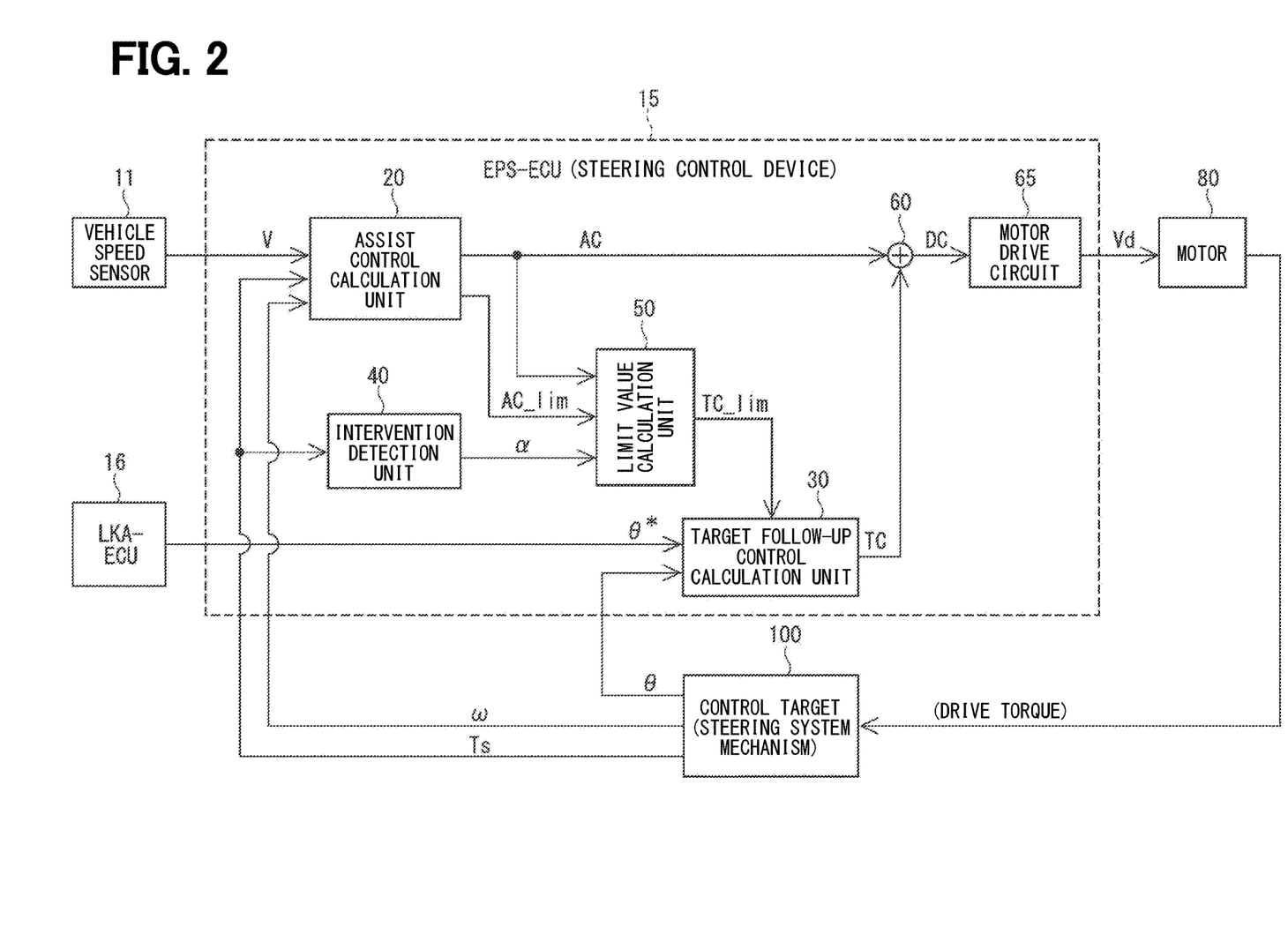
FIG. 2 is a block diagram showing an entire configuration of an EPS-ECU according to one embodiment.

Next, the configuration and operational effects of the EPS-ECU 15 will be described. As shown in FIG. 2, the EPS-ECU 15 includes an assist control calculation unit 20, a target tracking control calculation unit 30, an intervention detection unit 40, a limit value calculation unit 50, a command adder 60, a motor drive circuit 65, and the like.

The assist control calculation unit 20 generates an assist command AC that generates an assist torque corresponding to the steering torque Ts. Specifically, the assist control calculation unit 20 generates the assist command AC in order to realize a transmission feeling according to the road surface reaction force (or road surface load) and a feel according to the steering state based on the steering torque Ts, the motor rotation angular velocity ω, and the vehicle speed V. This control executed by the assist control calculation unit 20 is called as an "assist control". As a specific calculation method for the assist command AC, a well-known technique is appropriately used.

The assist command AC generated by the assist control calculation unit is output to the command adder 60 and the limit value calculation unit 50. Further, the assist command limit value AC_lim, which is the upper limit of the absolute value |AC| of the assist command, is output from the assist control calculation unit 20 to the limit value calculation unit 50. The assist torque and the sign of the assist command AC corresponding to the assist torque are defined according to the rotation direction in which the torque is applied. For example, the torque applied in the counterclockwise direction is defined as positive, and the torque applied in the clockwise direction is defined as negative.

The target tracking control calculation unit 30 generates a tracking command TC that generates an automatic steering torque causing the motor rotation angle (hereinafter, also referred to as "actual angle") θ to track the target angle θ* based on the target angle θ* commanded by the LKA-ECU 16 and the actual angle θ. The sign of the tracking command TC is defined similarly to the assist command AC. Regarding the target angle θ* and the actual angle θ, for example, the angle on the left side with respect to the neutral position is defined as positive, and the angle on the right side with respect to the neutral position is defined as negative.

Here, the target angle θ* corresponds to a "target value of physical quantity related to steering", and the actual angle θ corresponds to a "detection value of physical quantity". This control executed by the target tracking control calculation unit 30 is called as a "tracking control". The lane keep control is an example of the tracking control when the physical quantity is the rotation angle of the motor. Examples of other tracking controls are described in the "Other Embodiments".

The tracking command TC generated by the target tracking control calculation unit 30 is output to the command adder 60, and the command adder 60 calculates the addition value for the tracking command TC and the assist command AC. The detailed configuration of the target tracking control calculation unit 30 will be described with reference to FIGS. 3 and 4.

The intervention detection unit 40 detects intervention in the tracking control by steering of the driver. The intervention detection unit 40 of the present embodiment acquires the steering torque Ts detected by the torque sensor, calculates the intervention coefficient α based on the absolute value |Ts| of the steering torque, and outputs the intervention coefficient α to the limit value calculation unit 50. The intervention coefficient α is 1 when there is no intervention by the driver's steering, and is set to approach 0 as the degree of intervention increases. A detailed configuration of the intervention detection unit 40 will be described later with reference to FIG. 5A.

The limit value calculation unit 50 acquires the assist command AC and the assist command limit value AC_lim from the assist control calculation unit 20, and acquires the intervention coefficient α from the intervention detection unit 40. Based on this information, the limit value calculation unit 50 calculates the tracking command limit value TC_lim, which is the upper limit of the absolute value |TC| of the tracking command, and outputs the tracking command limit value TC_lim to the target tracking control calculation unit 30. In particular, when the control is switched from the tracking control to the assist control by the driver's steering, the limit value calculation unit 50 reduces the tracking command limit value TC_lim according to the assist command AC. The detailed configuration of the limit value calculation unit 50 will be described with reference to FIGS. 6 and 7.

The command adder 60 calculates the drive command DC which is an addition value of the assist command AC and the tracking command TC. The motor drive circuit 65 drives the motor 80 by applying the drive voltage Vd to the motor 80 according to the drive command DC. As a result, the motor 80 outputs the assist torque and the automatic steering torque corresponding to the drive command DC.

In a configuration that has been proposed, when the intervention detection unit 40 detects the intervention by the steering of the driver during the execution of the tracking control, the responsiveness of the tracking control is lowered and the execution degree of the assist control is increased. This configuration still generates an automatic steering torque by the tracking command during the control switching from the start of the intervention operation by the steering of the driver until the intervention coefficient drops to 0 and the switch to the assist control is completed. Since the assist torque is canceled by this automatic steering torque, the steering torque during control switching may be excessive.

The present embodiment reduces the steering torque at the time of switching from the tracking control to the assist control by the driver's steering. Therefore, the limit value calculation unit 50 decreases the tracking command limit value TC_lim corresponding to the assist command AC. Hereinafter, this configuration will be described in detail.

Figure 3:
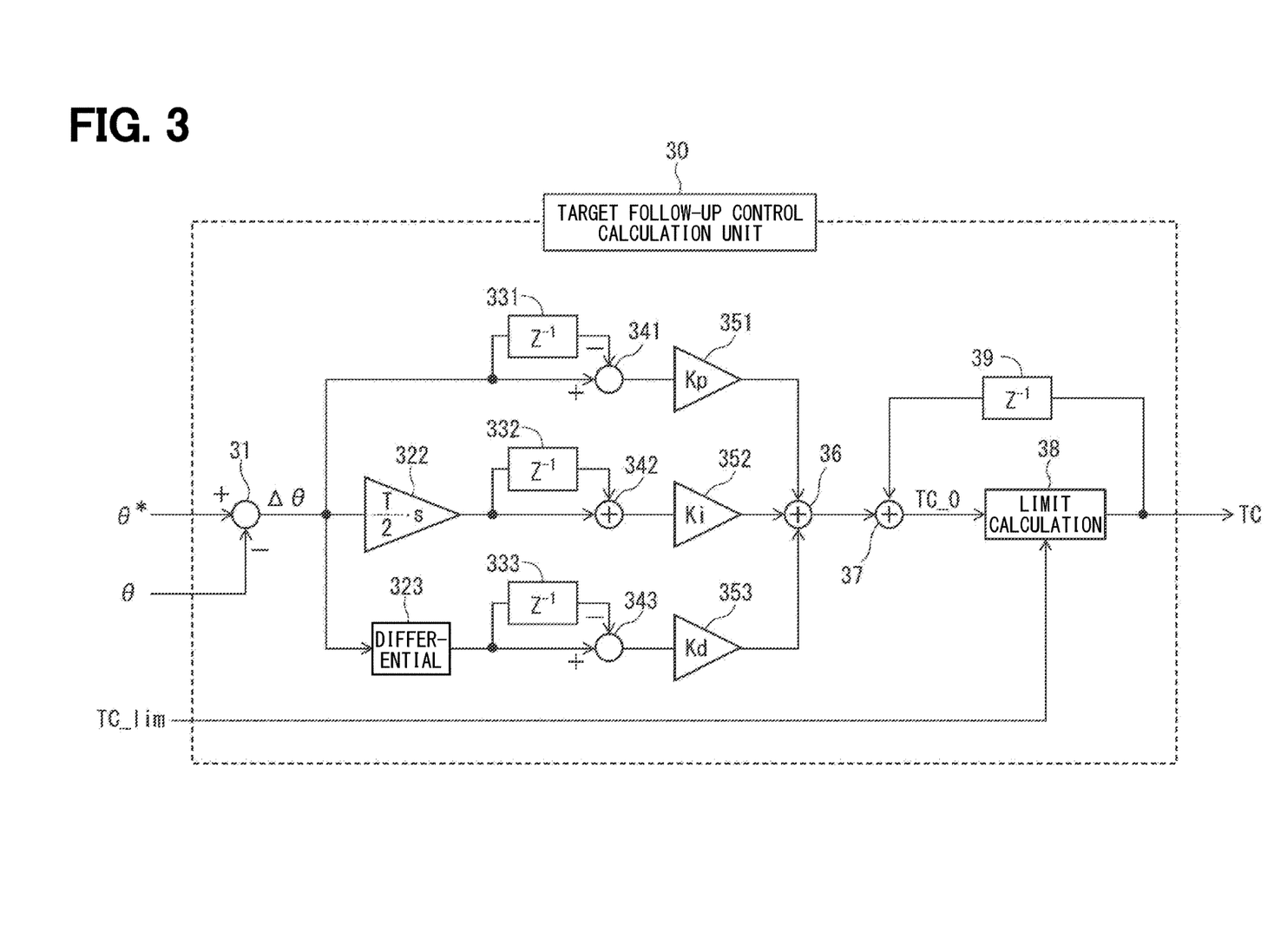
FIG. 3 is a block diagram showing a target tracking control calculation unit.

The configuration of the target tracking control calculation unit 30 will be described with reference to FIGS. 3 and 4. As shown in FIG. 3, the target tracking control calculation unit 30 calculates the tracking command TC based on the target angle θ*, the actual angle θ, and the tracking command limit value TC_lim. The angle deviation calculator 31 calculates the angle deviation Δθ between the target angle θ* commanded by the LKA-ECU 16 and the actual angle θ fed back from the control target 100.

In the present embodiment, PID control is performed so that the angle deviation Δθ approaches 0. The proportional term proportional to the angle deviation Δθ is calculated by a delay element 331, a subtractor 341, and a Kp multiplier 351. The integral term related to the integral value of the angle deviation Δθ is calculated by an integral calculator 322, a delay element 332, an adder 342, and a Ki multiplier 352. "T" of the integral calculator 322 indicates the calculation period, and "s" indicates the variable of the bilinear transform. The differential term related to the differential value of the angular deviation Δθ is calculated by a pseudo differential calculator 323, a delay element 333, a subtractor 343, and a Kd multiplier 353.

The proportional term, the integral term and the differential term are added by the adder 36. The pre-limit tracking command TC_0 is calculated by adding the previous value of the tracking command TC input via the delay element 39 to the addition value by the adder 37.

The pre-limit tracking command TC_0 and the tracking command limit value TC_lim calculated by the limit value calculation unit 50 are input to the limit calculation unit 38. Here, the pre-limit tracking command TC_0 takes 0 or a positive or negative value, and the tracking command limit value TC_lim takes 0 or a positive value. The limit calculation unit 38 calculates the tracking command TC by comparing the absolute value |TC_0| of the pre-limit tracking command with the tracking command limit value TC_lim.

When "|TC_0|≤TC_lim" is satisfied, the limit calculation unit 38 calculates the tracking command TC according to the equation (1.1).

$$TC=TC\_0 \tag{1.1}$$

When "TC_lim<|TC_0|" is satisfied, the limit calculation unit 38 calculates the tracking command TC according to the equation (1.2).

$$TC=TC\_lim \times sgn(TC\_0) \tag{1.2}$$

Figure 4:
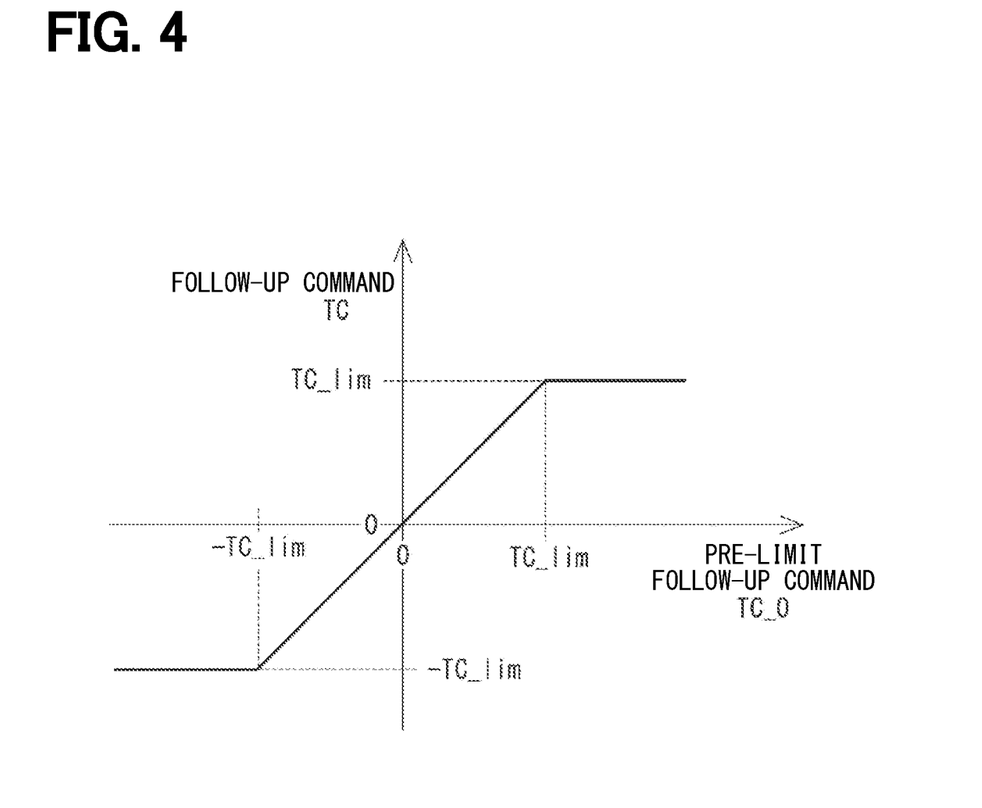
FIG. 4 is a diagram showing a limit calculation map of a tracking command TC.

That is, as shown in FIG. 4, when the pre-limit tracking command TC_0 is positive, the upper limit of the tracking command TC is limited by the tracking command limit value TC_lim. When the pre-limit tracking command TC_0 is negative, the lower limit of the tracking command TC is limited by a negative limit value (−TC_lim) obtained by reversing the tracking command limit value from positive to negative.

Figure 5A:
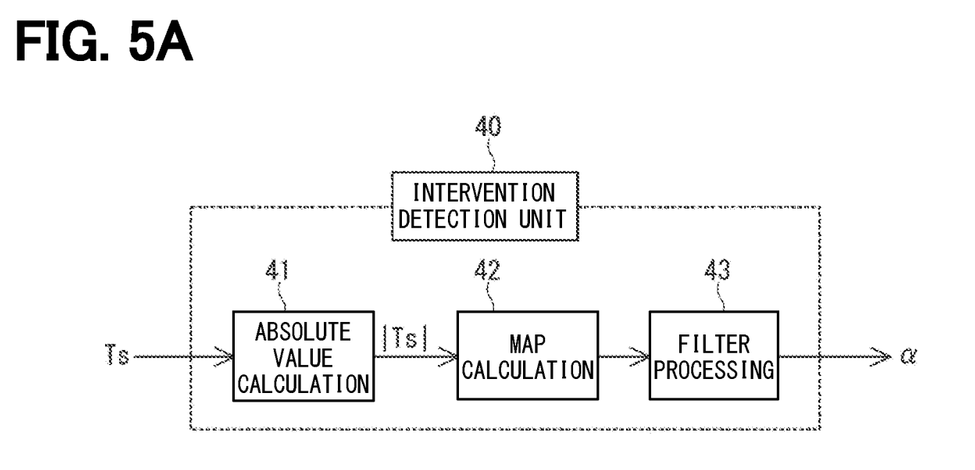
FIG. 5A is a block diagram showing an intervention detection unit.
Figure 5B:
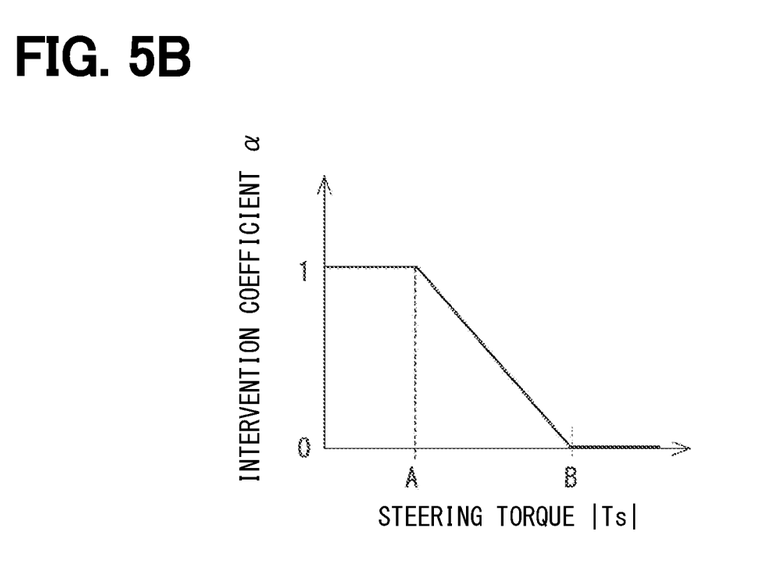
FIG. 5B is a map of an intervention coefficient α.

Next, the configuration of the intervention detection unit 40 will be described with reference to FIGS. 5A and 5B. As shown in FIG. 5A, the intervention detection unit 40 calculates the intervention coefficient α based on the steering torque Ts. The absolute value calculation unit 41 calculates the absolute value |Ts| of the steering torque. The map calculation unit 42 calculates the intervention coefficient α using the map shown in FIG. 5B. This map is similar to a map disclosed in FIG. 3 of Patent Literature 1. In the map, α satisfies α=1 in |Ts|<A, α satisfies α=0 in |Ts|>B. In the range of A≤|Ts|≤B, α monotonically decreases from 1 to 0. The intervention detection unit 40 may calculate the intervention coefficient α by a mathematical formula instead of the map.

The filter processing unit 43 removes noise such as road surface disturbance superimposed on the steering torque Ts by processing the input with a low-pass filter. The order of the map calculation unit 42 and the filter processing unit 43 may be changed, and the filter processing may be performed before the map calculation.

Figure 6:
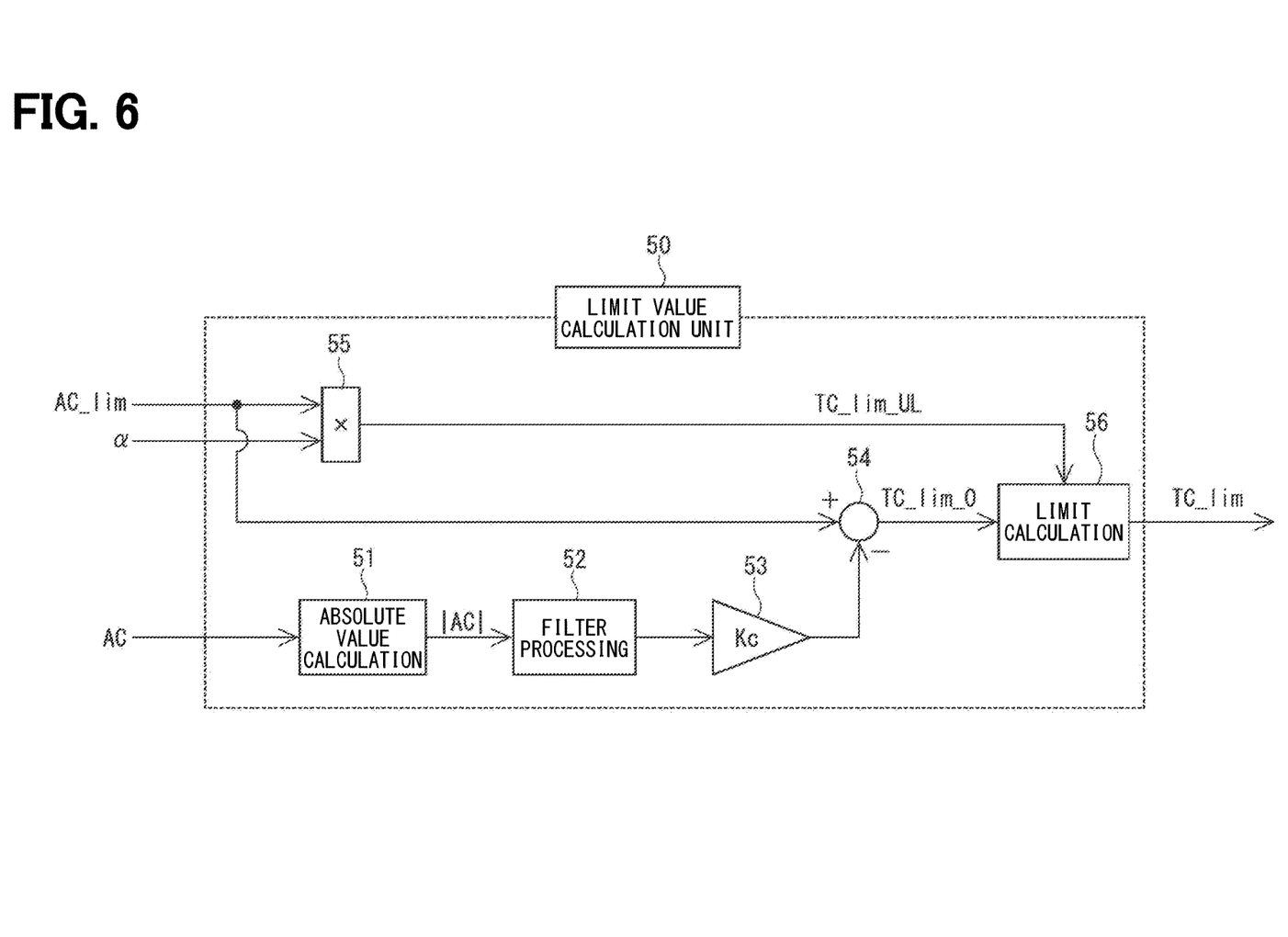
FIG. 6 is a block diagram showing a limit value calculation unit.

Next, the configuration of the limit value calculation unit 50 will be described with reference to FIGS. 6 and 7. As shown in FIG. 6, the limit value calculation unit 50 calculates the tracking command limit value TC_lim based on the assist command limit value AC_lim, the intervention coefficient α, and the assist command AC. Here, the assist command limit value AC_lim takes 0 or a positive value, and the assist command AC takes 0 or a positive or negative value. The intervention coefficient α takes a value from 0 to 1.

The absolute value calculation unit 51 calculates the absolute value |AC| of the assist command. The filter processing unit 52 removes the noise superimposed on the assist command AC by processing the input with a low-pass filter. The adjustment gain multiplier 53 multiplies the absolute value |AC| of the assist command after filtering by the adjustment gain Kc which is a positive value. The multiplication result, that is, the output value of the adjustment gain multiplier 53 becomes 0 or a positive value.

The subtractor 54 outputs a value obtained by subtracting the output value of the adjustment gain multiplier 53 from the assist command limit value AC_lim as a pre-limit tracking command limit value TC_lim_0. When the case where the assist command AC is 0 is substantially excluded, this subtraction decreases the pre-limit tracking command limit value TC_lim_0. Then, the amount of reduction in the pre-limit tracking command limit value TC_lim_0 due to this subtraction is adjusted by the adjustment gain Kc.

The pre-limit tracking command limit value TC_lim_0 is input to the limit calculation unit 56. Further, the tracking command limit value upper limit TC_lim_UL calculated by multiplying the assist command limit value AC_lim by the intervention coefficient α by the multiplier 55 is input to the limit calculation unit 56. The limit calculation unit 56 compares the pre-limit tracking command limit value TC_lim_0 with the tracking command limit value upper limit TC_lim_UL, and calculates the tracking command limit value TC_lim. The calculated tracking command limit value TC_lim is output to the target tracking control calculation unit 30 as described above.

When "TC_lim_0<0" is satisfied, the limit calculation unit 56 calculates the tracking command limit value TC_lim by the equation (2.1).

TC_lim=0    (2.1)

When "0≤TC_lim_0≤TC_lim_UL" is satisfied, the limit calculation unit 56 calculates the tracking command limit value TC_lim by the equation (2.2).

TC_lim=TC_lim_0    (2.2)

When "TC_lim_UL<TC_lim_0" is satisfied, the limit calculation unit 56 calculates the tracking command limit value TC_lim by the equation (2.3).

TC_lim=TC_lim_UL    (2.3)

Figure 7:
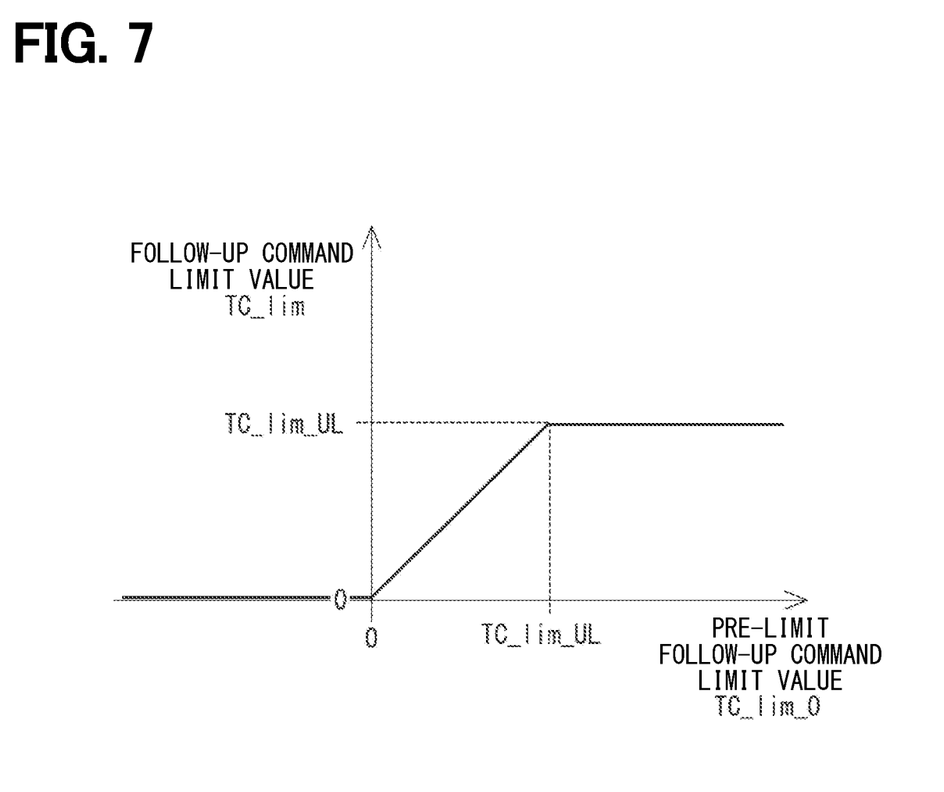
FIG. 7 is a diagram showing a limit calculation map of a tracking command limit value TC_lim.
Figure 8A:
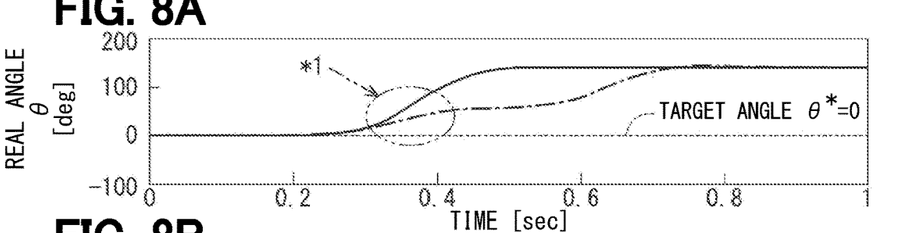
FIG. 8A is a time chart showing an operation example of the EPS-ECU according to one embodiment.
Figure 8B:
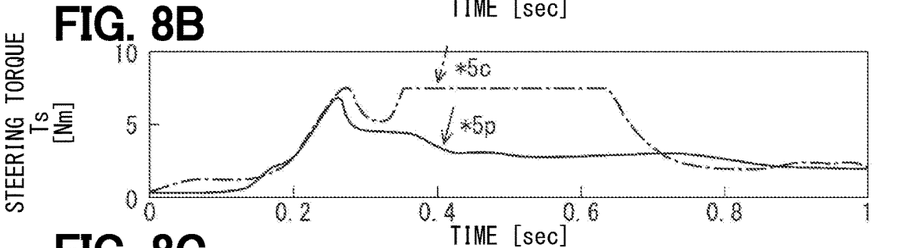
FIG. 8B is a time chart showing an operation example of the EPS-ECU according to one embodiment.
Figure 8C:
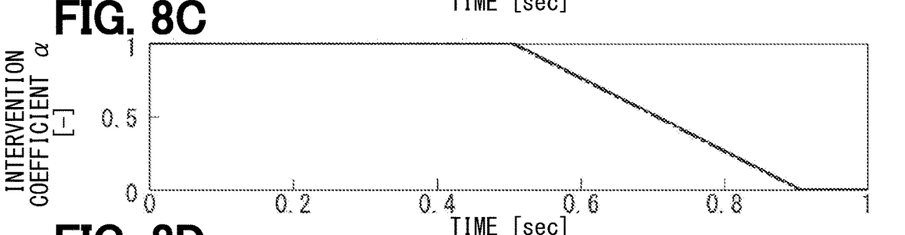
FIG. 8C is a time chart showing an operation example of the EPS-ECU according to one embodiment.
Figure 8D:
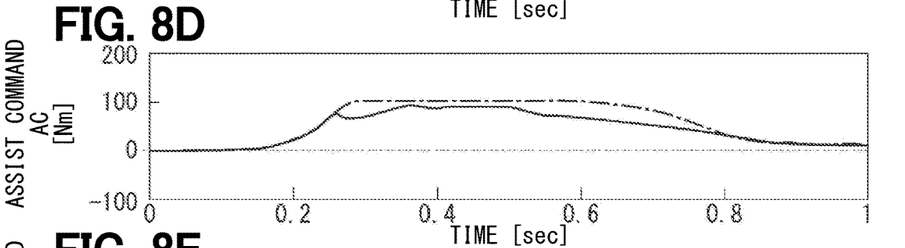
FIG. 8D is a time chart showing an operation example of the EPS-ECU according to one embodiment.
Figure 8E:
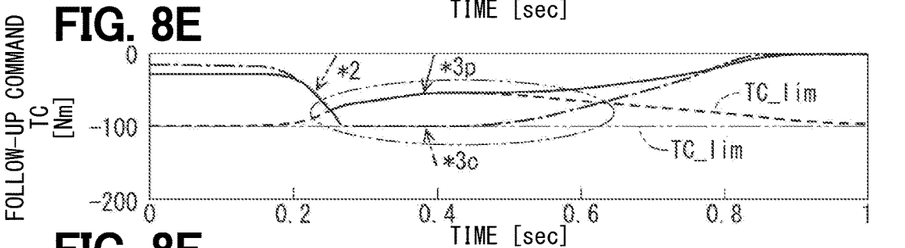
FIG. 8E is a time chart showing an operation example of the EPS-ECU according to one embodiment.
Figure 8F:
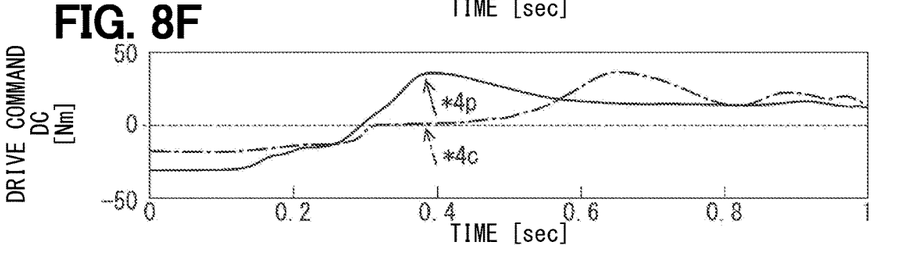
FIG. 8F is a time chart showing an operation example of the EPS-ECU according to one embodiment.

That is, as shown in FIG. 7, the lower limit of the tracking command limit value TC_lim is guarded by 0, and the upper limit of the tracking command limit value TC_lim is guarded by the tracking command limit value upper limit TC_lim_UL. In the range of "0 TC_lim_0 TC_lim_UL", the amount of decrease in the pre-limit tracking command limit value TC_lim_0 due to the subtraction of the subtractor 54 is directly reflected as the amount of decrease in the tracking command limit value TC_lim. That is, in the limit value calculation unit 50 as a whole, "subtraction that reduces the pre-limit tracking command limit value TC_lim_0" is understood that "subtraction that reduces the tracking command limit value TC_lim."

Next, an operation example according to the present embodiment will be described with reference to the time chart of FIG. 8. In this operation example, when the target angle θ*=0 [deg], the control is switched from the tracking control to the assist control by steering of the driver. Each of the vertical axes of FIG. 8 indicates an actual angle θ, a steering torque Ts, an intervention coefficient α, an assist command AC, a tracking command TC, and a drive command DC in order from the top.

The solid line in each figure shows the operation of the present embodiment in which the tracking command limit value TC_lim is subtracted, and the dot-dashed line shows the operation of the comparative example in which the tracking command limit value TC_lim is not subtracted. In the figure of the tracking command TC, the broken line indicates the tracking command limit value TC_lim in the present embodiment, and the dot-dot dashed line indicates the tracking command limit value TC_lim in the comparative example. In the present embodiment, the tracking command limit value TC_lim is set to 0 or a positive value, and does not become a negative value. However, in the figure of the tracking command TC, for convenience of comparison, the positive/negative of the tracking command limit value TC_lim is inverted and described as a negative value. In addition, symbols such as (*1) in each figure indicate points cited in the following explanations.

Here, in the present embodiment, when the steering torque Ts increases from 0 and a state that exceeds a predetermined threshold value continues for a predetermined time, the intervention coefficient α starts decreasing from 1. As a result, when the steering torque Ts temporarily increases due to disturbance or the like, it is possible to avoid erroneous determination that the driver has been steered. Specifically, the steering torque Ts starts increasing at about 0.3 [sec], while the intervention coefficient α starts decreasing from about 0.5 [sec]. When the intervention coefficient α reaches 0 at about 0.9 [sec], the transition to assist control is completed.

The difference in operations between the present embodiment and the comparative example appears as a difference in steering torque Ts. The steering torque Ts becomes excessive during the control switching in the comparative example. In the present embodiment, the steering torque Ts is inhibited from becoming excessive and the control switching is smoothly performed. The difference in operations will be described in detail below.

First, in a comparative example, the flow until the steering torque Ts becomes excessive will be described. In (*1), the actual angle θ deviates from the target angle θ* due to driver steering. In (*2), a tracking command TC in the direction opposite to the steering direction (negative direction in the figure) is output in order to correct the deviation. In (*3c), the tracking command limit value TC_lim is not subtracted and is constant. The tracking command TC is limited by the tracking command limit value TC_lim from before 0.3 [sec] to about 0.5 [sec], and then the absolute value decreases as the intervention coefficient α decreases.

In (*4c), the assist command AC (positive torque in the figure) generated by the driver steering is canceled by the tracking command TC (negative torque). Therefore, the drive command DC, which is the sum of the assist command AC and the tracking command TC, is not output. Since the drive command DC is not output, the steering torque Ts becomes excessive at (*5c).

Next, a flow in which the control switching becomes smooth by the logic of the present embodiment will be described. (*1) and (*2) are the same as in the comparative example. In (*3p), the tracking command limit value TC_lim decreases as the assist command AC increases. As a result, the tracking command TC is limited. Thus, the drive command DC, which is the sum of the assist command AC and the tracking command TC, can be output at (*4p). As a result, the steering assist by the motor 80 functions, and the steering torque Ts is decreased at (*5p).

(Effects)

(1) In the ESP-ECU 15 of the present embodiment, the limit value calculation unit 50 reduces the tracking command limit value TC_lim according to the assist command AC when the control is switched from the tracking control to the assist control by the driver's steering. Specifically, when the absolute value |Ac| of the assist command is 0, the limit value calculation unit 50 maintains the tracking command limit value TC_lim. The limit value calculation unit 50 decreases the tracking command limit value TC_lim as the absolute value |Ac| of the assist command increases.

As a result, in the present embodiment, the configuration inhibits the tracking command TC from obstructing the steering at the time of control switching from the start of the intervention operation by the steering of the driver to the completion of the transition to the assist control. Therefore, the steering torque Ts at the time of control switching can be decreased.

(2) The limit value calculation unit 50 adjusts the amount of decrease in the tracking command limit value TC_lim according to the assist command AC by the adjustment gain Kc of the adjustment gain multiplier 53. As a result, the steering feeling of the driver can be adjusted.

(3) The limit value calculation unit 50 filters the assist command AC by the filter processing unit 52. As a result, the influence of disturbance and noise can be eliminated and the control can be stabilized.

(4) The map calculation unit 42 of the intervention detection unit 40 calculates the intervention coefficient α. The intervention coefficient α is 1 when there is no intervention by steering of the driver. The intervention coefficient α approaches 0 as the degree of intervention increases. Then, the limit value calculation unit 50 calculates the tracking command limit value upper limit TC_lim_UL based on the assist command limit value AC_lim and the intervention coefficient α. As a result, even when the absolute value |Ac| of the assist command is relatively small, the tracking command limit value TC_lim can be lowered.

(Other Embodiments)

(1) The "physical quantity related to steering" to be subject for the tracking control may be an amount such as a steering wheel rotation angle, a tire steering angle, or a yaw rate, other than the motor rotation angle of the above embodiment. The "deviation between the target value of the physical quantity and the detected value" may be a lateral displacement from the target position obtained by the camera, laser radar, millimeter wave radar, or the like, a deviation from the target trajectory obtained by GPS or the like, or curvature obtained by the road shape. In tracking control, the automatic steering torque is generated based on the deviation. Further, the steering angle tracking control such as the motor rotation angle may be applied to the control of automatic driving, automatic parking, or the like other than the lane keeping control.

(2) The method for which the intervention detection unit 40 detects the driver's intervention operation is not limited to the method based on the steering torque Ts detected by the torque sensor. The method may detect the driver's intervention operation based on the difference between the rotation angle sensor attached to the steering wheel 91 and the motor rotation angle or the speed difference therebetween.

(3) The specific configuration for decreasing the tracking command limit value TC_lim by the limit value calculation unit 50 is not limited to the configuration shown in FIG. 6. For example, instead of adjusting the reduction amount by using the adjustment gain for the assist command AC, the gain may be multiplied by the pre-limit tracking command limit value TC_lim_0. Further, when the noise of the assist command AC does not matter, the filter processing may be omitted. Further, the command limit value upper limit TC_lim_UL may be calculated using a coefficient other than the intervention coefficient α.

(4) In the above embodiment, the tracking command limit value TC_lim is set to take 0 or a positive value, but the tracking command limit value TC_lim may be set to take 0 or a positive or negative value. Even when the tracking command limit value TC_lim takes a negative value in that configuration, the limit value calculation unit 50 "decreases the absolute value |TC_lim| of the tracking command limit value according to the assist command AC". As a result, the control with the similar logic in the above embodiment can be performed.

As described above, the present disclosure is not limited to the embodiments described above, and can be implemented in various forms without departing from the spirit of the present disclosure.

The control unit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. Further, the computer program may store a computer-readable non-transitional tangible recording medium as an instruction to be executed by the computer.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A steering control device for a power steering system of a vehicle, wherein the power steering system includes a steering mechanism that is configured to be operated by a human driver to steer wheels of the vehicle and is configured to be driven by an electric motor, the steering control device comprising:
an assist control calculation circuitry configured to perform an assist control for generating an assist command that generates an assist torque for driving the steering mechanism through the electric motor based on a steering torque applied to the steering mechanism;
a target tracking control calculation circuitry configured to acquire a target value of physical quantity related to a steering of the steering mechanism, and perform a tracking control for generating a tracking command that generates an automatic steering torque for causing a detection value of physical quantity of the steering mechanism to track the target value in response to application of the automatic steering torque to the steering mechanism through the electric motor;
an intervention detection circuitry configured to detect an intervention of the human driver to the tracking control caused by a steering operation of the human driver on the steering mechanism, wherein the intervention detection circuitry is configured to calculate an intervention coefficient while the intervention coefficient calculated by the intervention detection circuitry is set to be 1 at a time of absence of the intervention and decreases from 1 toward 0 only after the steering torque is kept above a threshold value for more than a predetermined time period;
a limit value calculation circuitry configured to calculate a tracking command limit value that is an upper limit of an absolute value of the tracking command, and output the tracking command limit value to the target tracking control calculation circuitry; and
a motor drive circuit configured to drive the electric motor based on a drive command that is an addition value of the assist command and the tracking command, wherein
the electric motor is configured to output the assist torque and the automatic steering torque,
the limit value calculation circuitry is configured to calculate an upper limit of an absolute value of the tracking command limit value based on the intervention coefficient and an assist command limit value while the assist command limit value is an upper limit of an absolute value of the assist command, and
when the tracking control is switched to the assist control in response to the steering operation of the human driver, the limit value calculation circuitry begins to decrease the absolute value of the tracking command limit value in response to the assist command to limit an increase of the steering torque, which is caused by cancelation of the assist command by the tracking command, before a time of starting a decrease in the intervention coefficient calculated by the intervention detection circuitry.

2. The steering control device according to claim 1, wherein
the limit value calculation circuitry adjusts an amount of decrease in the absolute value of the tracking command limit value in response to the assist command by an adjustment gain.

3. The steering control device according to claim 1, wherein
the limit value calculation circuitry filters the assist command.

4. A steering control device for a power steering system of a vehicle, wherein the power steering system includes a steering mechanism that is configured to be operated by a human driver to steer wheels of the vehicle and is configured to be driven by an electric motor, the steering control device comprising:
a processor configured to
perform an assist control for generating an assist command that generates an assist torque for driving the steering mechanism through the electric motor based on a steering torque applied to the steering mechanism,
acquire a target value of physical quantity related to a steering of the steering mechanism,
perform a tracking control for generating a tracking command that generates an automatic steering torque for causing a detection value of physical quantity of the steering mechanism to track the target value in response to application of the automatic steering torque to the steering mechanism through the electric motor,
detect an intervention of the human driver to the tracking control caused by a steering operation of the human driver on the steering mechanism, wherein the processor is configured to calculate an intervention coefficient while the intervention coefficient calculated by the processor is set to be 1 at a time of absence of the intervention and decreases from 1 toward 0 only after the steering torque is kept above a threshold value for more than a predetermined time period, and
calculate a tracking command limit value that is an upper limit of an absolute value of the tracking command; and
a motor drive circuit configured to drive the electric motor based on a drive command that is an addition value of the assist command and the tracking command, wherein
the electric motor is configured to output the assist torque and the automatic steering torque,
the processor is configured to calculate an upper limit of an absolute value of the tracking command limit value based on the intervention coefficient and an assist command limit value while the assist command limit value is an upper limit of an absolute value of the assist command, and
when the tracking control is switched to the assist control in response to the steering operation of the human driver, the processor begins to decrease the absolute value of the tracking command limit value in response to the assist command to limit an increase of the steering torque, which is caused by cancelation of the assist command by the tracking command, before a time of starting a decrease in the intervention coefficient calculated by the processor.

5. The steering control device according to claim 1, wherein the steering mechanism includes:
   a steering wheel configured to be operated by the human driver;
   the wheels; and
   a shaft assembly that couples between the steering wheel and the wheels.

* * * * *